Patented Aug. 16, 1938

2,126,952

UNITED STATES PATENT OFFICE 2,126,952

HYDRATION OF OLEFINES

Henry Dreyfus, London, England

No Drawing. Application November 26, 1932, Serial No. 644,491. In Great Britain December 22, 1931

9 Claims. (Cl. 260—614)

This invention relates to the hydration of olefines and especially to the manufacture of ethyl alcohol and/or diethyl ether by the hydration of ethylene.

I have found that the hydration of ethylene and other olefines can be effected in a very satisfactory manner by leading mixtures of the olefine and steam in contact with salts having high affinity for water and especially acid salts or salts of an acid character having high affinity for water. As instances of such catalysts may be mentioned sulphates of an acid nature such as bisulphates and pyrosulphates, especially of the alkali metals, and chlorides such as calcium chloride, zinc chloride, and magnesium chloride.

The reaction may be performed at temperatures upwards of about 100° C. and especially at temperatures between about 150° and 350° C. or more. Elevated pressures are very useful for accelerating the reaction, for example pressures up to 15 to 25 atmospheres. However, higher pressures or considerably higher pressures may be employed if desired.

In the application of the invention ethylene and steam may be passed over, through or otherwise in contact with the catalysts under the desired conditions of temperature and pressure. For example the reaction mixture may be passed through tubes or the like containing the catalysts which may, if desired, be supported upon or otherwise associated with filling materials or carriers such as pumice, kieselguhr, carborundum, silica gel, etc. Alternatively, the reaction mixtures may be passed through molten or liquid baths comprising the catalyst in the molten state, as described in my co-pending U. S. application S. No. 640,002 filed October 28, 1932, through molten or liquid baths containing the solid catalyst for instance in a state of suspension, or through aqueous or other solutions of the catalysts as described in my co-pending U. S. application S. No. 640,001 filed October 28, 1932.

The ethylene and steam may be present in the mixture to be employed in any convenient proportion according to the nature of the desired hydration products. Thus, if substantial quantities of diethyl ether are to be obtained a mixture comprising about two or more volumes of ethylene to one volume of water vapor may be employed. If, on the other hand, ethyl alcohol is to be the main product, mixtures containing more water vapor, for instance equal volumes of ethylene and water vapor, may be used. Usually mixtures containing substantially equimolecular proportions or containing some excess of ethylene are to be preferred since the use of such mixtures facilitates the recovery of concentrated or highly concentrated alcohol from the reaction products. If desired inert or diluent gases or vapors such as nitrogen may also be present.

While it is preferred to employ mixtures of ethylene and steam the invention is not limited in this respect as, if desired, the water may be employed in the liquid state. For instance, ethylene may be passed in contact with aqueous solutions of the catalysts as described in my U. S. application S. No. 640,001 corresponding to British application No. 35368/31 or otherwise brought into contact with water in the liquid state of the catalysts.

If, instead of mixtures of ethylene and steam, mixtures of higher olefines and steam are employed, the corresponding higher alcohols and ethers can readily be obtained by means of the invention. Thus, for instance, isopropyl alcohol can readily be obtained if mixtures of propylene and steam are employed. If desired, the mixtures may contain a plurality of olefines whether or not they contain ethylene, and from such mixtures mixtures of alcohols and ethers can readily be obtained.

The following examples illustrate the invention, but are not to be considered as in any way limiting it.

Example 1

A mixture of approximately 3 volumes of ethylene and 2 volumes of water vapor is preheated to about 250° C. and subsequently passed over sodium bisulphate deposited on pumice and heated to a temperature of 325° C. under a pressure of 20 atmospheres. The vapors, on leaving the reaction zone, are cooled, if desired while still under pressure, and the ethyl alcohol formed is condensed and may be separated from the water remaining after the reaction, and from any ether formed in the reaction, in any convenient way. Advantageously, any ethylene remaining is mixed with further water vapor and recirculated through the reaction zone.

Example 2

A mixture of approximately 3 volumes of ethylene and 1 volume of water vapor is preheated to about 200° C. and passed over calcium chloride deposited on pumice and heated to a temperature of 300° C. under a pressure of 25 atmospheres. The main product of the reaction is diethyl ether, which may be separated from the water vapor remaining and from any alcohol formed, in any convenient way.

By the phrase "sulphate of an acid nature" is to be understood any salt of sulphuric acid containing a higher proportion of sulphuric anhydride than do the normal sulphates such as sodium sulphate $Na_2SO_4$.

What I claim and desire to secure by Letters Patent is:—

1. Process for the hydration of olefines which comprises contacting an olefine with water vapor at an elevated temperature and under superatmospheric pressure in the presence of a catalyst comprising essentially a salt of an acid character having a high affinity for water selected from the group consisting of sulphates and chlorides of acid character.

2. Process for the hydration of olefines which comprises contacting an olefine with water vapor at an elevated temperature and under superatmospheric pressure in the presence of an oxide-free catalyst mass comprising a sulphate of an acid nature.

3. Process for the hydration of olefines which comprises contacting an olefine with water vapor at an elevated temperature and under superatmospheric pressure in the presence of an oxide-free catalyst mass comprising a chloride of an acid character.

4. Process for the hydration of olefines which comprises contacting an olefine with water vapor at a temperature between 150° and 350° C. and under superatmospheric pressure in the presence of a catalyst comprising essentially a salt of an acid character having a high affinity for water selected from the group consisting of sulphates and chlorides of acid character.

5. Process of the manufacture of ethanol, which comprises the steps of preheating a mixture comprising between 1 and 2 volumes of ethylene and 1 volume of water vapor and passing the mixture at a temperature between 150° and 350° C. and under a pressure between 1 and 25 atmospheres in contact with an oxide-free catalyst mass comprising a sulphate of an acid nature.

6. Process for the manufacture of ethanol, which comprises the steps of preheating a mixture comprising between 1 and 2 volumes of ethylene and 1 volume of water vapor and passing the mixture at a temperature between 150° and 350° C. and under a pressure between 1 and 25 atmospheres in contact with an oxide-free catalyst mass comprising a chloride of an acid character.

7. Process for the manufacture of diethyl ether, which comprises the steps of preheating a mixture comprising at least 2 volumes of ethylene and 1 volume of water vapor and passing the mixture at a temperature between 150° and 350° C. and under a pressure between 1 and 25 atmospheres in contact with an oxide-free catalyst mass comprising a sulphate of an acid nature.

8. A process for the production of a hydration product of an olefine comprising directly hydrating the olefine under superatmospheric pressure and at an elevated temperature sufficient to effect hydration of the olefine in the presence of water and zinc chloride.

9. A process for the production of a hydration product of an olefine comprising directly hydrating the olefine under superatmospheric pressure and at an elevated temperature sufficient to effect the hydration of the olefine in the presence of water and magnesium chloride.

HENRY DREYFUS.